United States Patent [19]

Terao et al.

[11] Patent Number: 5,404,348
[45] Date of Patent: Apr. 4, 1995

[54] METHOD FOR RECORDING AND REPRODUCING INFORMATION USING AT LEAST TWO ENERGY BEAMS

[75] Inventors: Motoyasu Terao, Tokyo; Kunikazu Ohnishi, Yokohama; Tesuya Nishida, Koganei; Hiroshi Yasuoka, Kokubunji; Keikichi Ando, Musashino; Norio Ohta, Iruma; Hirofumi Sukeda, Kokubunji; Yoshito Tsunoda, Tokyo; Toshimitsu Kaku, Sagamihara, all of Japan

[73] Assignee: Hitachi, Ltd., Tokyo, Japan

[21] Appl. No.: 634,049

[22] Filed: Dec. 26, 1990

Related U.S. Application Data

[63] Continuation of Ser. No. 421,302, Oct. 3, 1989, abandoned, which is a continuation of Ser. No. 146,592, Jan. 21, 1988, abandoned.

[30] Foreign Application Priority Data

Jan. 26, 1987 [JP] Japan .................................. 62-14161
Feb. 6, 1987 [JP] Japan .................................. 62-24535

[51] Int. Cl.6 ............................................... G11B 7/00
[52] U.S. Cl. ..................................... 369/116; 369/44.37
[58] Field of Search ................... 369/100, 13, 16, 109, 369/110, 116; 346/762, 44.57; 365/112, 113

[56] References Cited

U.S. PATENT DOCUMENTS

| | | | |
|---|---|---|---|
| 4,403,318 | 9/1983 | Nagashima et al. | 369/100 |
| 4,656,079 | 4/1987 | Yamada et al. | 369/100 |
| 4,710,911 | 12/1987 | Yamada et al. | 369/100 |
| 4,718,053 | 1/1988 | Sato et al. | 369/100 |
| 4,754,446 | 6/1988 | Reno | 369/100 |
| 4,787,077 | 11/1988 | Barton et al. | 369/100 |
| 4,841,514 | 6/1989 | Tsub0i et al. | 369/100 |
| 4,853,912 | 8/1989 | Akasaka et al. | 369/100 |
| 4,888,750 | 12/1989 | Kryder et al. | 369/100 |
| 4,953,150 | 8/1990 | Sonobe | 369/100 |
| 4,980,879 | 12/1990 | Yamada et al. | 369/100 |
| 5,123,007 | 6/1992 | Miyauchi et al. | 369/100 |

FOREIGN PATENT DOCUMENTS 0214228 9/1986 Japan .................................. 369/100

*Primary Examiner*—Aristotelis Psitos
*Assistant Examiner*—Nabil Hindi
*Attorney, Agent, or Firm*—Antonelli, Terry, Stout & Kraus

[57] ABSTRACT

According to the present invention, a so-called overwrite operation which records new information while erasing existing information can be reliably performed in an information storage system such as optical disk system. In addition, whether the rewriting of recording has been properly done can be verified.

29 Claims, 7 Drawing Sheets

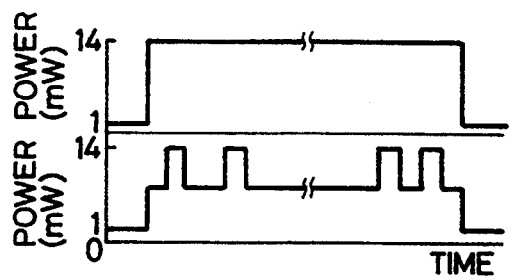
FIG. 1A
FIG. 1B
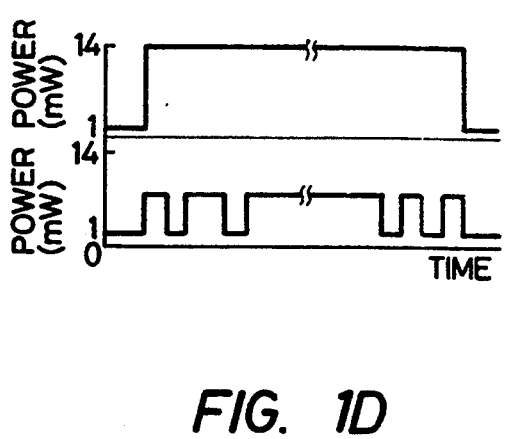
FIG. 1C
FIG. 1D
FIG. 1E
FIG. 1F
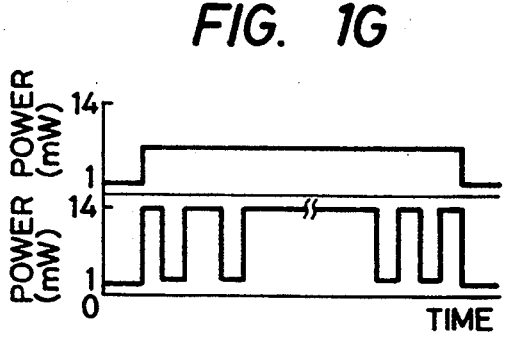
FIG. 1G (a)
(b)
(c)
(d)
(e)

METHOD FOR RECORDING AND REPRODUCING INFORMATION USING AT LEAST TWO ENERGY BEAMS

This is a continuation of application Ser. No. 421,302, filed Oct. 3, 1989, which is a continuation of application Ser. No. 146,592, filed Jan. 21, 1988, now abandoned.

BACKGROUND OF THE INVENTION

The present invention relates to a recording (including erasing) and reproducing method in information recording apparatuses such as an optical disk system wherein information is recorded by projecting an energy beam. More particularly, it relates to a method of recording and reproducing information which employs a recording film, e.g., a magneto optic recording film, or a reversible phase transition type capable of high-speed phase transition and which is capable of the so-called "overwrite" wherein new information is recorded while existing information is being erased.

There have been known various systems which perform recording on the basis of the projection of an energy beam such as a light beam or an electron beam. Among them, a method wherein a laser beam, for example, is projected on a reversible phase transition type optical recording medium to rewrite recording includes (1) a method disclosed in Japanese Patent Application Laid-open No. 71140/1984. In this method, an elliptical light spot longer in the direction of a track (guide groove) and a circular light spot are employed. The track in which information is to be written is first crystallized by the continuous light projection of the elliptical light spot. Subsequently, the power of the circular light spot passing on the track is raised in the shape of pulses in accordance with information signals, whereby the information is recorded by amorphization, namely, the turning of the crystal into an amorphous state, attendant upon melting and quenching. In addition, (2) Japanese Patent Application Laid-open No. 28530/1980 discloses a method wherein the power of a single light beam is changed between a noncrystallization power level and a crystallization power level, thereby to record or erase information. Further, as another example employing a single light beam, (3) Japanese Patent Application Laid-open No. 145530/1981 discloses a method wherein, in writing or rewriting information into a recording film crystallized up to perfect saturation, a light beam is projected which is intensity-modulated according to information signals between a amorphization power level and a crystallization power level.

Meanwhile, in case of recording information on or erasing recorded information from an optical disk, it is necessary to verify if the information to be recorded or erased is actually recorded or erased. In a prior-art method which employs an optical head having a single laser beam, the verification is done in such a way that one revolution of the disk is awaited after the recording or erasure, whereupon the power of the laser beam is lowered to a read power level. Besides, as regards a pitting write-once type optical disk, a method wherein, if recording is properly performed is verified by detecting the reflected light of recording light during a recording operation, is disclosed in (4) Japanese Patent No. 1264450. However, as regards a write-once or rewritable type optical disk utilizing the change of an atomic arrangement such as the phase transition, the reflected light waveform of recording light differs from that of the pitting type, and hence, there has not been an example wherein the propriety of recording or erasure is verified by detecting the reflected light of the recording light or erasing light.

Among the prior-art techniques mentioned above, the method which employs the two beams of a light beam for forming the elliptical light spot and a light beam for forming the circular light spot is further classified into two. One of them is a method wherein, in order to project the two beams on an identical track, the relative positions between the beams are fixed so that when one beam is positioned on the track, the other beam may be projected on the same track. With this method, however, a positional error is prone to develop due to, e.g., the deviation of an optical system ascribable to a temperature change or vibrations. With the other method which uses both the beams for tracking, the above problem is solved. Since, however, the elliptical light spot affords a low resolution, it is difficult to read a concavity or convexity or the like on the disk expressive of a track address, and it cannot be verified that the two beams fall on an identical track.

Among the aforementioned prior-art techniques, each method employing the single light beam is free from such problems. However, the certainty of rewriting might degrade, and recording information at high reliability is not easy.

Besides, in the prior-art technique concerning the optical disk which utilizes the atomic arrangement change such as phase transition, a period of time corresponding to one revolution of the disk (for example, 33 ms. for 1800 r.p.m.) is expended in surplus for verifying the recording or erasure. This leads to the problem of a long access time.

SUMMARY OF THE INVENTION

An object of the present invention is to provide an information recording and reproducing method which can rewrite information reliably and stably.

Another object of the present invention is to provide an information recording and reproducing method which can verify recording in a short time.

The objects are accomplished in such a way that two energy beams are employed, that the projection regions of the two energy beams on a recording medium are substantially equalized in shape and area, and that the following roles are allotted to the two energy beams in order to rewrite recording:

(1) A method wherein the beam which is first projected on the disk is used for bringing the whole projected part into a fixed state and the beam which is subsequently projected is used for partly changing the state or for changing the state into either of at least two states, thereby to write information.

(2) A method wherein the beam which is first projected is used for an overwrite operation, and the beam which is subsequently projected is used for another overwrite operation or for re-projection for ensuring a state change.

(3) A method wherein a state change in a certain direction is caused by one of the beam which is first projected and the beam which is subsequently projected, and a state change in the opposite direction is caused by the other.

In addition to the three methods, there is:

(4) a method wherein one of the beam which is first projected and the beam which is subsequently projected is used for an overwrite operation, and the other is used for reading information, or (5) a method wherein the beam which is first projected is used for an overwrite operation at a fixed frequency or for a partial state change in a certain direction, and the beam which is subsequently projected is used for an overwrite operation or for a state change in the opposite direction.

In each of the above methods, means for generating the two energy beams may be two independent energy sources, for example, two semiconductor lasers or may well be a unitary structure, for example, a laser array. It is also allowed to use two beams into which one beam from a single energy source is split. Preferably, the two beams can perform tracking and verify track addresses independently of each other.

Since, as stated before, the two energy beams have substantially the same shapes and the same areas, the respective beams can be used for tracking a recording track and for reading and verifying the track address thereof. It is accordingly possible to project the two beams reliably on the predetermined track.

Further, in each of the above methods, preferably that of the two energy beams which is projected on the spot of the disk later is used for verifying if recording at the first time or the rewriting of recording is properly done.

BRIEF DESCRIPTION OF THE DRAWINGS

FIGS. 1A–1G are diagrams each showing the power modulation patterns of energy beams in the first method of the present invention;

DETAILED DESCRIPTION OF THE PREFERRED EMBODIMENTS

Figure 2A:
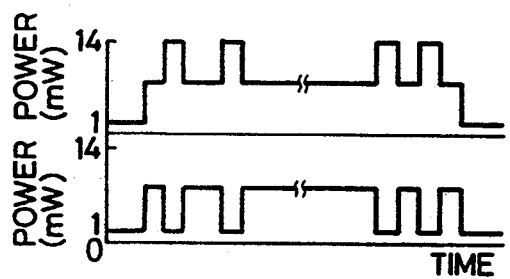
FIGS. 2A–2D are diagrams each showing the power modulation patterns of energy beams in the second method of the present invention.

Now, each of the foregoing methods will be described in detail. In the ensuing description, the "rewriting of recording" shall also include a case where information is recorded on a track bearing no recorded information for the first time. Besides, in each of FIG. 1A—FIG. 5E, the time axis of the power variation pattern of the beam to be projected first as shown in the upper stage is delayed relative to the time axis of the beam to be projected later as shown in the lower stage in order that the points projected on the same point on the disk may be correspondingly depicted between the upper stage and the lower stage.

The five methods of the present invention stated before are realized by more concrete methods to be explained below:

(1) The method wherein the beam to be first projected on the disk is used for bringing the whole projected part into a fixed state, and the beam to be subsequently projected is used for partly changing the fixed state into another state or for changing the fixed state into either of at least two states, thereby to write information, includes the following methods;

(a) A method wherein as illustrated in FIG. 1A, the power of the beam (first beam) which is first projected on the disk is raised from a low power level and is projected on a region to-be-recorded at a high power level held substantially constant, and the beam (second beam) which is subsequently projected is modulated according to information signals between an intermediate power level and the high power level, thereby to rewrite recording.

By way of example, in case of using a recording medium which utilizes the phase transition between a crystal and an amorphous state, the beam which is first projected is used for bringing the whole track into a nearly amorphous state, and the beam which is subsequently projected is used for recording information through crystallization and amorphization (in which the track is left intact in the nearly amorphous state). The first merit of this method is as stated below. For example, in case of a recording film whose principal components are In and Se, there is often required an operation (initialize) in which the projection part of the film is melted by the projection of a laser beam of high power at the beginning, to change the state of the film as evaporated into the state thereof capable of steadily performing rewriting. Since this operation can be effected by the beam to be first projected, it need not be done beforehand. As the second merit, owing to the projection of the laser beam at the high constant power, the deformation of a recording film or a protective film attributed to previous recording is flattened, the whole sector or track is caused to undergo phase transition with a large width, and any high-melting crystal produced is melted, whereby unerased parts can be prevented. With the laser beam of the high power which is first projected, the film does not always fall into the nearly amorphous state, but a recording film the crystallization rate of which is especially high approximates a crystalline state. The reason is that, in the case of continuous light projection of constant power, the cooling rate of a point on the disk is lower than in case of pulsed light projection, so crystallization takes place during cooling after the projection.

(b) A method wherein as illustrated in FIG. 1B, the beam which is first projected on the disk is projected at a high power level held substantially constant, and according to information signals, the beam which is subsequently projected is set at an intermediate power level in only parts to be irradiated with the intermediate power beam, and it is held at a low power level in the other parts, thereby to rewrite recording.

(c) A method wherein as illustrated in FIG. 1C, the beam which is first projected on the disk is projected at a high power level held substantially constant, and the beam which is subsequently projected is power-modulated according to information signals between a low power level and the high power level, thereby to rewrite recording.

(d) A method wherein as illustrated in FIG. 1D, the beam which is first projected on the disk is projected at a high power level held substantially constant, and the beam which is subsequently projected is power-modulated according to information signals between the high power level and a power level intermediate between 0 (zero) level and the high level, thereby to rewrite recording.

(e) A method wherein as illustrated in FIG. 1E, the beam which is first projected on the disk is projected at an intermediate power level held substantially constant, and the beam which is subsequently projected is power-modulated according to information signals between the intermediate power level and a high level, thereby to rewrite recording. This method is effective in that even a recording film of somewhat slow crystallization can be reliably crystallized.

(f) A method wherein as illustrated in FIG. 1F, the beam which is first projected on the disk is is projected at an intermediate power level held substantially constant, and the beam which is subsequently projected is power-modulated according to information signals between a low power level and a high power level, thereby to rewrite recording. This method is advantageous in that noncrystallization is reliably conducted by the subsequently projected beam.

(g) A method wherein as illustrated in FIG. 1G, the beam which is first projected on the disk is projected at an intermediate power level held substantially constant, and the beam which is subsequently projected is power-modulated according to information signals between a high power level and a power level intermediate between the high power level and 0 level, thereby to rewrite recording.

(2) The method wherein the beam which is first projected is used for an overwrite operation, and the beam which is subsequently projected is used for another overwrite operation or for re-projection for ensuring a state change, includes the following methods;

(a) A method wherein as illustrated in FIG. 2A, the beam which is first projected on the disk is modulated according to information signals between an intermediate power level and a high power level, and the beam which is subsequently projected is power-modulated according to the same information signals between the intermediate power level and a low power level, thereby to rewrite recording. This method is advantageous in that even a recording film of somewhat low crystallization rate can be reliably crystallized.

Figure 2B:
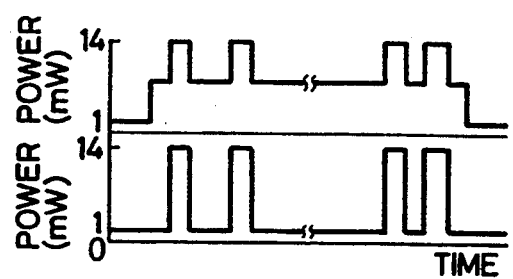

(b) A method wherein as illustrated in FIG. 2B, the beam which is first projected on the disk is power-modulated according to information signals between an intermediate power level and a high power level, and the beam which is subsequently projected is power-modulated according to the same information signals between a low (read) power level and the high power level, thereby to rewrite recording.

Figure 2C:
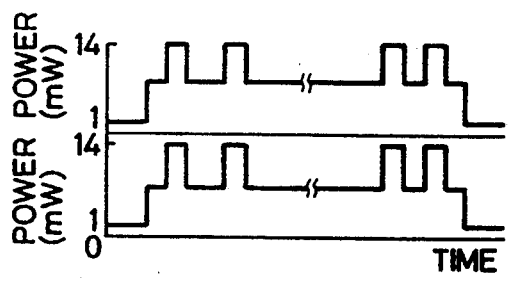

(c) A method wherein as illustrated in FIG. 2C, the beam which is first projected on the disk and the beam which is subsequently projected are set at the same power modulation patterns, and they are power-modulated according to information signals between an intermediate power level and a high power level, thereby to rewrite recording.

Figure 2D:
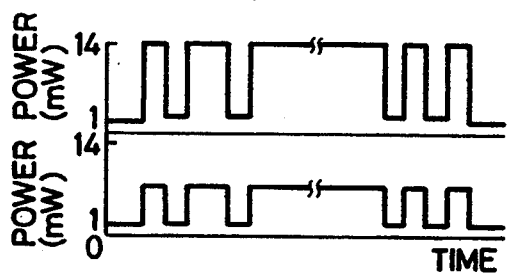

(d) A method wherein as illustrated in FIG. 2D, the beam which is first projected on the disk is modulated according to information signals between a high power level and a power level intermediate between the high level and 0 level, and the beam which is subsequently projected is modulated according to the same information signals between a low power level and the intermediate power level, thereby to rewrite recording.

Figure 3A:
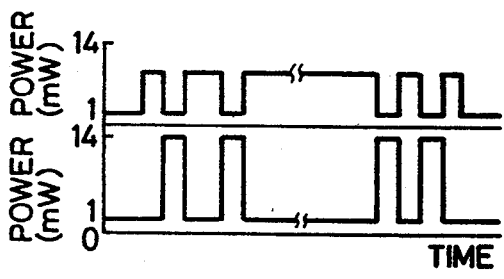
FIGS. 3A–3D are diagrams each showing the power modulation patterns of energy beams in the third method of the present invention.

(3) The method wherein a state change in a certain direction is caused by one of the beam which is first projected and the beam which is subsequently projected, and a state change in the opposite direction is caused by the other, includes the following methods;

(a) A method wherein as illustrated in FIG. 3A, the beam which is first projected on the disk is set according to information signals at an intermediate power level in only parts to be irradiated with the intermediate power beam and at a low power level in the other parts, and the beam which is subsequently projected is power-modulated according to the information signals between the low power level and a high power level, thereby to rewrite recording. This method is advantageous in that noncrystallization is reliably effected.

Figure 3B:
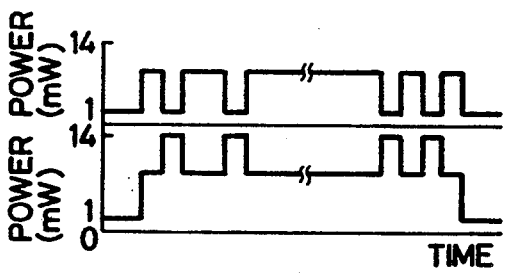

(b) A method wherein as illustrated in FIG. 3B, the beam which is first projected on the disk is set according to information signals at an intermediate power level in only parts to be irradiated with the intermediate power beam and at a low power level in the other parts, and the beam which is subsequently projected is power-modulated according to the same information signals between the intermediate power level and a high power level, thereby to rewrite recording.

Figure 3C:
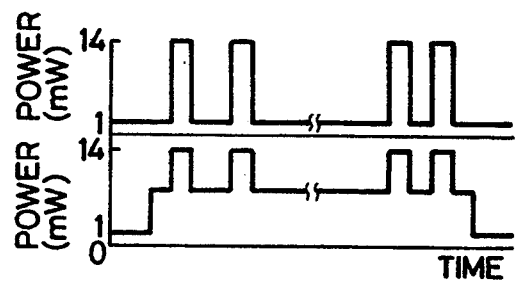

(c) A method wherein as illustrated in FIG. 3C, the beam which is first projected on the disk is power-modulated according to information signals between a low power level and a high power level, and the beam which is subsequently projected is power-modulated according to the same information signals between an intermediate power level and the high power level, thereby to rewrite recording.

Figure 3D:
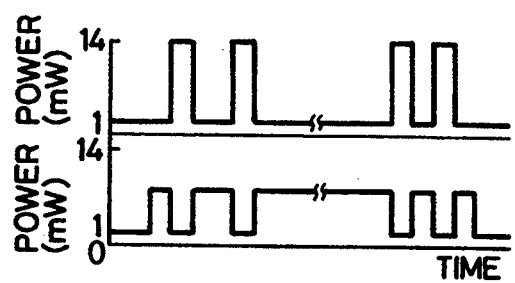

(d) A method wherein as illustrated in FIG. 3D, the beam which is first projected on the disk is set according to information signals at a high power level in only parts to be irradiated with the high power beam and at a low power level in the other parts, and the beam which is subsequently projected is set according to the information signals at an intermediate power level in only the parts to be irradiated with the intermediate power level and at the low power level in the other parts, thereby to rewrite recording.

Figure 4A:
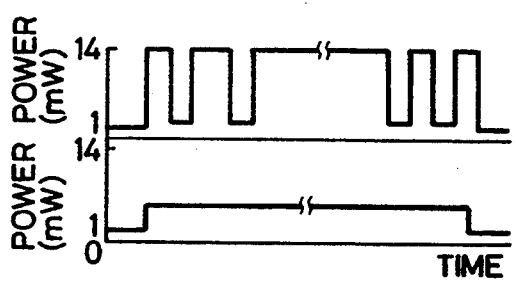
FIGS. 4A–4D are diagrams each showing the power modulation patterns of energy beams in the fourth method of the present invention.

(4) The method wherein one of the beam which is first projected and the beam which is subsequently projected is used for an overwrite operation, and the other is used for reading information, includes the following methods;

(a) A method wherein as illustrated in FIG. 4A, the beam which is first projected on the disk is modulated according to information signals between a high power level and a power level intermediate between the high power level and a low power level, and the beam which is projected later is projected at a somewhat lower intermediate power level, thereby to rewrite recording. This method causes a state change in one direction a little by virtue of the beam projected later, thereby intending to reduce unerased parts in the next rewrite operation.

Figure 4B:
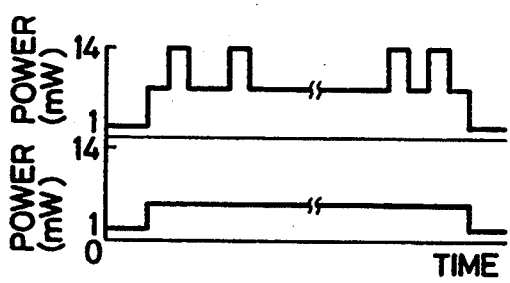

(b) A method wherein as illustrated in FIG. 4B, the beam which is first projected on the disk is modulated according to information signals between an intermediate power level and a high power level, and the beam which is projected later is projected at a somewhat lower intermediate power level, thereby to rewrite recording. Also with this method, a state change in one direction is previously caused a little by the beam projected later.

Figure 4C:
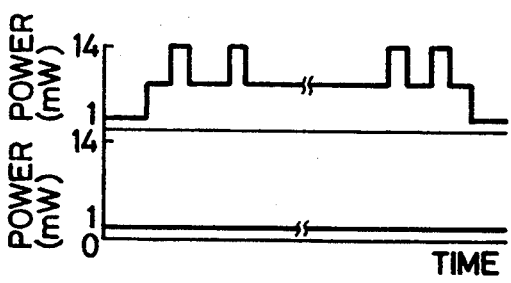

(c) A method wherein as illustrated in FIG. 4C, the beam which is first projected on the disk is power-modulated according to information signals between an intermediate power level and a high power level, to rewrite recording, and the beam which is subsequently projected is held at a low level, to verify if the rewrite operation has been properly performed.

Figure 4D:
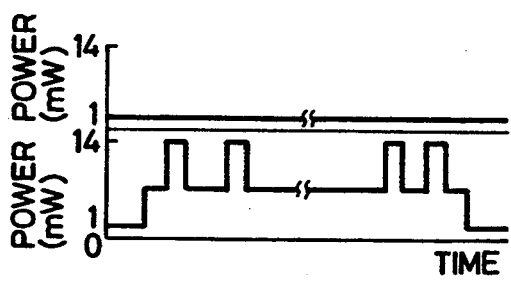

(d) A method wherein as illustrated in FIG. 4D, the beam which is first projected on the disk is held at a low power level, to perform at least either of the verification of a place to be rewritten and the verification of a recorded state, and the beam which is subsequently projected is power-modulated according to information signals between an intermediate power level and a high power level, thereby to perform a rewrite operation.

Figure 5A:
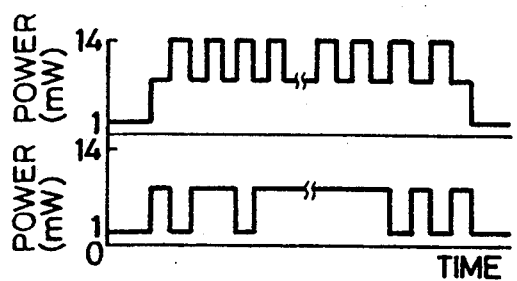
FIGS. 5A–5E are diagrams each showing the power modulation patterns of energy beams in the fifth method of the present invention.

(5) The method wherein the beam which is first projected is used for an overwrite operation at a fixed frequency or for a partial state change in a certain direction, and the beam which is subsequently projected is used for an overwrite operation or for a state change in the opposite direction, includes the following methods;

(a) A method wherein as illustrated in FIG. 5A, the beam which is first projected on the disk is regularly power-modulated with the minimum unit of information signals as a period and between an intermediate power level and a high power level, and the beam which is subsequently projected is set according to the information signals at the intermediate power level in only parts to be irradiated with the intermediate power beam and at a low power level in the other parts, thereby to rewrite recording.

Figure 5B:
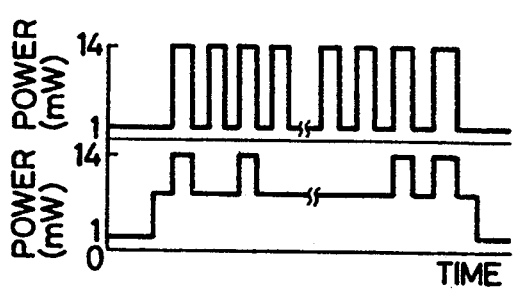

(b) A method wherein as illustrated in FIG. 5B, the beam which is first projected on the disk is regularly power-modulated with the minimum unit of information signals as a period and between a low power level and a high power level, and the beam which is subsequently projected is power-modulated according to the information signals between an intermediate power level and the high power level, thereby to rewrite recording.

Figure 5C:
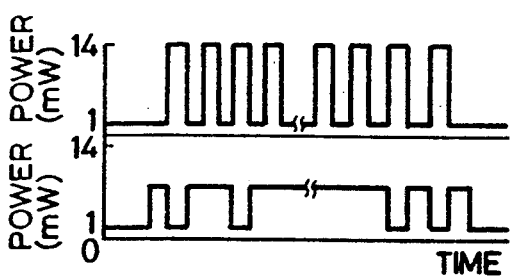

(c) A method wherein as illustrated in FIG. 5C, the beam which is first projected on the disk is regularly power-modulated with the minimum unit of information signals as a period and between a low power level and a high power level, and the beam which is subsequently projected is set according to the information signals at an intermediate power level in only parts to be irradiated with the intermediate power beam and at the low power level in the other parts, thereby to rewrite recording.

Figure 5D:
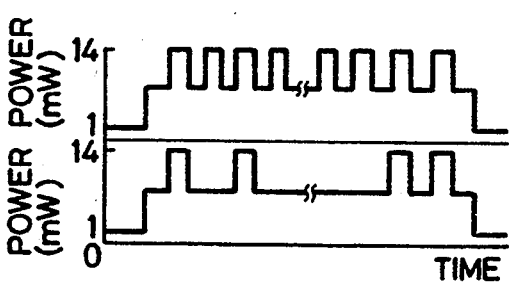

(d) A method wherein as illustrated in FIG. 5D, the beam which is first projected is regularly power-modulated with the minimum unit of information signals as a period and between an intermediate power level and a high power level, thereby to rewrite recording, and the beam which is subsequently projected is power-modulated according to the information signals between the intermediate power level and the high power level, thereby to rewrite the recording.

Figure 5E:
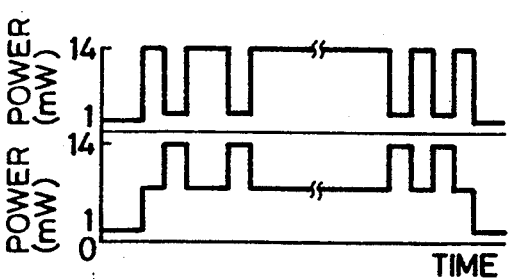

(e) A method wherein as illustrated in FIG. 5E, the beam which is first projected is modulated between a high power level and a power level intermediate between the high power level and a low power level in accordance with information signals, and the beam which is subsequently projected is power-modulated between an intermediate power level and the high power level in accordance with the information signals, thereby to rewrite recording.

In each of FIG. 1A–FIG. 5E referred to above, the time positions of the power variation of the beam to be first projected as shown in the upper stage and the time positions of the power variation of the beam to be subsequently projected as shown in the lower stage are in perfect agreement. In some cases, however, the rewrite operation is more perfectly performed when the time positions of the variations are somewhat staggered out of the perfect agreement.

In each of the various methods stated above, the two beams need not always be located on an identical recording track. Regarding, for example, an optical disk, the respective beams may well be arranged on adjacent tracks. Such a method is applicable to, e.g., a case where signals which persist for a long time such as video signals or audio signals are rewritten while an optical head is being continuously fed in the radial direction of the disk. In this method, the second beam is projected on parts irradiated with the first beam one revolution ago, using the same information signals as used for the first beam one revolution ago.

In addition, it is common to the various methods that the "low power level" usually signifies the read power level. It is sometimes the case, however, that the power may well be rendered 0 (zero). In a case of modulating power between the intermediate power level and the high power level, it is favorable that the power level is first raised from the low power level to a power level corresponding to the erasure of information (which should preferably be the intermediate power level, but which may well be the high power level), whereupon the power is modulated. It is also possible, however, that the power level is first raised to a power level corresponding to the writing of information, whereupon the power is modulated. In a case of employing a recording medium in which information is recorded by giving rise to a phase change (also called "phase transition," "phase transformation" etc.) between a state exhibitive of the high regularity of an atomic arrangement, for example, a polycrystalline state, and a state exhibitive of the low regularity of the atomic arrangement, for example, a state close to amorphism, it is frequent to consider the change from the crystalline state into the nearly amorphous state as writing and the reverse change as erasure. Of course, it is allowed to consider conversely. Besides, in the case of utilizing such phase changes, the energy beam projection at the high power level brings at least a part of a projection region into the nearly amorphous state, and the energy beam projection at the intermediate power level brings it into a nearly crystalline state.

In a case where both the beam to be first projected and the beam to be subsequently projected are projected at the high, intermediate or low power level, the power levels of the beams need not be exactly identical. Regarding, for example, the same intermediate power level, there can be a case where the level of the beam to be first projected is 7 mW, while that of the beam to be subsequently projected is 8 mW. In such a case, it is often favorable to adjust the power levels so that the temperatures of both projection regions may be substantially equalized.

The methods of the present invention are not restricted to the aforementioned phase changes, but are also applicable to write operations based on other recording principles such as the phase change between crystals, the atomic arrangement change between amorphous states, and the inversion of magnetized directions.

When the power of the high power level is assumed to be unity, it is preferable that the intermediate power level ranges from at least 0.3 to at most 0.9 and that the low power level ranges from at least 0.03 to at most 0.2. However, there can be a case where the low power level is less than 0.03.

Besides, in each of the methods of the present invention, when the beam is projected for a state change in one direction, a place originally lying in that state remains unchanged.

Further, in any of the methods, the change rate of temperatures is enhanced in such a way that, when the power of the beam is to shift to another level through an upward or downward change, it is once changed beyond a predetermined level and is thereafter changed in the opposite direction so as to return to the predetermined level (by way of example, the power is caused to overshoot in the upward change). It is recommended to adopt this measure in at least either of the upward change and the downward change.

In any of the above methods, it is a matter of course that power changes of short durations which are hardly detected in reproduced signals may well be superposed. By way of example, as to the beam to be first projected in FIG. 1E, when the power is caused to fluctuate at a high frequency with the average value thereof held constant, there is the effect that unerased parts decrease. As another example, regarding the beam to be subsequently projected in FIG. 1C, when the projection of the low power level is inserted for a short time during the projection of a pulse having risen from the low power level to the high power level, thereby to divide the pulse into two or more, there are produced the effects that a state in which the atomic arrangement is more disordered can be established and that a reproduced signal comes to have a higher fidelity to an original signal.

The shapes and areas of the regions (spots) on which the two energy beams are projected need not always be perfectly the same. By way of example, it is favorable to enlarge the width of the beam taken in a direction orthogonal to tracks, the beam being projected at the high power level for a relatively short time and at the intermediate power level for a relatively long time. This is because, in the projection of the intermediate power level, a region to become an appropriate temperature is difficult of being widened for such a reason that the central part of the projection region becomes a temperature near a melting point and decreases the S/N ratio when the power level is raised. Incidentally, the width of each beam is defined as the length between those points of an intensity profile which have intensities equal to ½ of the peak of the intensity profile.

The rise and fall of the power need not always be abrupt as illustrated in each of FIG. 1A–FIG. 5E. By way of example, in a case where a recording film of high crystallization sate is employed and where a large extent in the direction orthogonal to tracks is noncrystallized by only the falling part of a pulse, to form the cause of an unerased part in the subsequent rewrite operation, the drawback is improved by making the fall somewhat gentle.

Utilizing the fact that the reflection level of recording light or erasing light varies according to the state changes of a recording film during a record operation or an erase operation, the method of recording and erasing information according to the present invention detects the variation as an electric signal in real time, and it verifies if normal recording or erasure has been performed, on the basis of variations in the waveform and intensity of the electric signal. Such verification makes use of, for example, the changes between two states among a plurality of states in which the regularity of an atomic arrangement differs. The two states may be a state of high regularity and a state of low regularity, for example, a crystalline state and a noncrystalline state, or they may well be two crystalline states of different crystal forms or two crystalline states having disorders in different forms, for example, two polycrystalline states of unequal grain sizes.

Either of the senses of the state changes between the two states of the recording film may be optionally considered as recording or as erasure, and the recording and erasing senses may be determined beforehand.

The two energy beam projections in the present invention may be two beam projections from a single optical head, or may well consist of respective beam projections from two optical heads. Alternatively, they may be the projections of one beam of a single optical head at the first and second revolutions of the disk. This measure has the demerit that the rate of data transfer becomes low, but it has the merit that the structure of the optical head is simplified.

Recording films suited to the recording and reproducing method of the present invention thus far described have the following compositions:

(1) A recording film in which an average composition in the direction of the thickness of the film is expressed by $A_X B_Y C_Z D_\alpha$ where X, Y, Z and $\alpha$ are values in ranges of $0 \leq X \leq 30$, $3 \leq Y \leq 25$, $35 \leq Z \leq 70$ and $20 \leq \alpha \leq 80$ in terms of atomic percentage, respectively; D denotes at least one element among Se and S; C denotes In; B denotes at least one element among Zn, Cd, Al, Ga, Si, Ge, Sn, Pb, As, Sb, Bi and Te; and A denotes one or more elements other than the elements denoted by B, C and D. Here, Te is especially preferable as the element denoted by B, and Se is more preferable as the element denoted by D.

(2) A recording film in which an average composition in the direction of the thickness of the film is expressed by $A_X B_Y C_Z D_\alpha$ where X, Y, Z and $\alpha$ are values in ranges of $0 \leq X \leq 30$, $3 \leq Y \leq 25$, $35 \leq Z \leq 70$ and $20 \leq \alpha \leq 80$ in terms of atomic percentage, respectively;

D denotes at least one element among Se and S; C denotes at least one element among As, Sb, Bi, Si, Ge, Sn, Pb, Ga, In, Zn and Cd; B denotes Te; and A denotes one or more elements other than the elements denoted by B, C and D. Here, In is the most preferable, followed by Sb, as the element denoted by C.

(3) A recording film in which an average composition in the direction of the thickness of the film is expressed by $A_X B_Y C_Z D_\alpha$ where X, Y, Z and $\alpha$ are values in ranges of $0 \leq X \leq 30$, $3 \leq Y \leq 15$, $45 \leq Z \leq 65$ and $30 \leq \alpha \leq 50$ in terms of atomic percentage, respectively; D denotes at least one element among Se and S; C denotes at least one element among Zn, Cd, Ga, In, Sn, Si, Ge, As, Sb and Pb; B denotes at least one element among Tl, halogen elements, group a elements from group Ia to group VIIa, group-VIII elements and group-Ib elements; and A denotes one or more elements other than the elements denoted by B, C and D. Here, Se is more preferable as the element denoted by D. In is the most preferable, followed by Sb, as the element denoted by C. As the element denoted by B, Tl is the most preferable, followed by at least one element among Co, Pd, Au, Ti and Ni.

(4) A recording film in which an average composition in the direction of the thickness of the film is expressed by $A_X B_Y C_Z D_\alpha$ where X, Y, Z and $\alpha$ are values in ranges of $0 \leq X \leq 30$, $1 \leq Y \leq 30$, $20 \leq Z \leq 65$ and $30 \leq \alpha \leq 75$ in terms of atomic percentage, respectively; D denotes Te; C denotes at least one element among Zn, Cd, Ga, In, Sn, Si, Ge, As, Sb, Bi and Pb; B denotes at least one element among Tl, halogen elements, group-a elements from group Ia to group VIIa, group-VIII elements and group-Ib elements; and A denotes one or more elements other than the elements denoted by B, C and D. Here, as the element denoted by C, at least one element among Ge, Sb, In, Si and Ga is preferable, and In is especially preferable. As the element denoted by B, at least one element among Co, Pd, Au, Ti and Ni is the most preferable, followed by Tl.

(5) An optomagnetic recording film a Tb-Fe-Co system or the like.

These compositions of the recording films (1)–(5) are suitable for use, not only in the recording and reproducing method of the present invention, but also in other recording and reproducing methods such as a method in which a rewrite (overwrite) operation is performed with a single laser beam.

Embodiment 1

Figure 6:
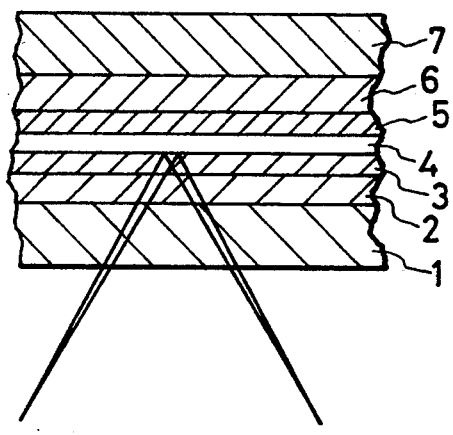
FIG. 6 is a sectional view showing the structure of an information recording medium employed in an embodiment of the present invention.

As shown in a sectional view of FIG. 6, there was formed a base plate in which a disk-shaped chemically-reinforced glass plate 1 having a diameter of 13 cm and a thickness of 1.2 mm was overlaid with an ultraviolet-hardenable resin layer 2, and a tracking groove and concavities expressive of track addresses or sector addresses were transferred on the surface of the resin layer. A ZnS layer 3 having a thickness of about 200 nm, to serve as an antireflection layer and also as a protective layer, an $In_{51}Te_{15}Se_{34}$ recording film 4 having a thickness of 180 nm, and an ZnS layer 5 having a thickness of about 200 nm were successively formed on the base plate. The ZnS layer was formed by magnetron sputtering, and the recording film by multi-source rotating simultaneous evaporation which employed evaporation sources each being of a single element. Subsequently, the disk thus obtained and the same glass plate 7 as the aforementioned chemically-reinforced glass plate were bonded by an epoxy type binder 6.

In performing recording, the resulting disk was rotated at 600 r.p.m., and two light beams of different wavelengths from optical heads were condensed, whereby two light spots proximate at a distance of about 20 $\mu$m were formed on an identical track. The two light spots executed tracking operations independently of each other, and were autofocused with a common lens. First, one light beam was set at a high power level of 14 mW on the disk and was projected on all tracks to initialize them. This recording film was noncrystallized by the initialization, but when its composition is changed, it is crystallized at least partly during cooling after the projection. Next, both the light beams were set at a reading low power level of 1 mW, to read the addresses of tracks and sectors and to move the light spots to the predetermined sector of a predetermined track. Then, the power levels of the respective light beams were modulated according to a modulation pattern as shown in FIG. 1A, thereby to record information. In this case, since the light beam first projected on the points of the disk has the same effect as that of the initialization stated above, the initializing operation can also be omitted. The light beam subsequently projected became the high power level for a time of about 250 ns, and the shortest interval thereof was also 250 ns. Parts on which the light beam subsequently projected was thrown at the high power level became a nearly amorphous state (were noncrystallized), whereas parts on which it was thrown at the intermediate power level became a polycrystalline state. When the composition of the recording film was changed to a composition affording a higher crystallization rate, only parts where the high power level fell to the low power level turned amorphous. Even when such recording was carried out for sectors where other information items had been once recorded, substantially the same states were attained, and rewriting was possible.

Apart from the above modulation pattern of FIG. 1A, even when the modulation patterns shown in FIG. 1B–FIG. 5E as stated before were used, recording could be similarly rewritten.

As described before, in each of the modulation pattern diagrams of FIG. 1A–FIG. 5E, the upper stage illustrates the modulation pattern of the beam to be first projected, while the lower stage illustrates the modulation pattern of the beam to be subsequently projected, and the axes of abscissas represent times, which are somewhat staggered between the upper and lower stages so that the parts of the patterns to be projected on the same points of the disk may correspond between both the stages. The difference between the times of the upper and lower stages was made greater at the outer circumference of the disk and smaller at the inner circumference thereof in correspondence with the difference of linear velocities at the inner and outer circumferences. Regarding the power levels of the beams to be projected, 8 mW was set as the intermediate power level, and 14 mW as the high power level.

The first initialize operation is not conducted continuously at the high power level of 14 mW, but using a waveform which varies periodically and in pulse shape between the read power level of 1 mW and the high power level of 15 mW, it is conducted in only places to be formed with recording points on the disk, so as to derive only the information of the recording points from a reproduced signal. Thus, when the laser beam of the high power level is projected, the reflection factors of the places perfectly return into states as initialized, and unerased parts can be prevented. Incidentally, only the information of the recording points may well be derived by changing the intensity of the read light in pulse shape.

In addition, when at the rise or/and fall of the power, the power level is brought beyond a target level and is thereafter brought back to the target level, there is the effect that the temperature change of the projected part is quickened. The initializing method employing pulses, and the various methods of raising and lowering the power levels are also effective for a rewrite (overwrite) operation based on a single beam.

Figure 7:
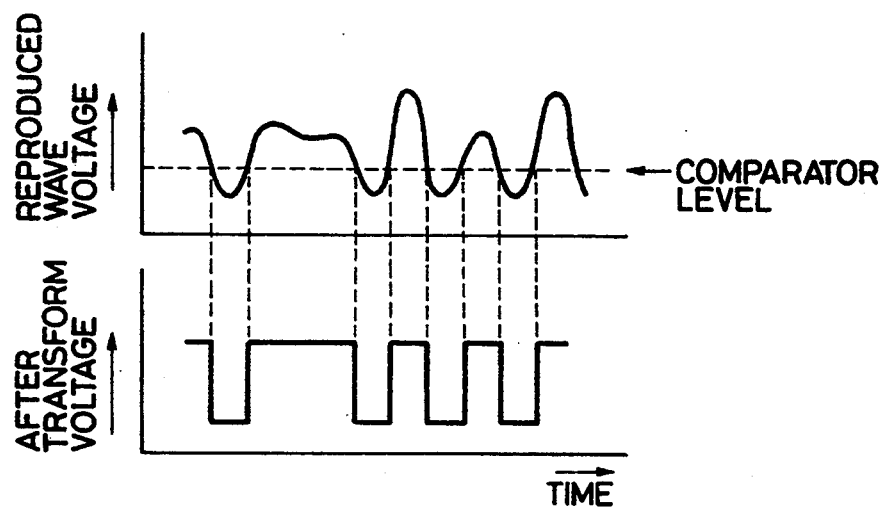
FIG. 7 is a diagram showing a method of setting a comparator level in an embodiment of the present invention.

Information from the disk subjected to recording as stated above was read out as follows: Both the power levels of the two laser beams to enter the disk were set at I mW of the read power level. While tracking and autofocusing were being performed, a reproduced signal was obtained on the basis of the output voltage of a photodetector which corresponded to the intensity of the reflected light of the beam to be first projected on the disk. A reproduced signal may well be obtained from the reflected light of the beam to be subsequently projected on the disk. Besides, in the read mode, the power of the beam not used for the reading may well be rendered 0 (zero). The reproduced signal was waveform-transformed by a comparator. In this regard, as shown in FIG. 7, the level of the reproduced signal fluctuates more in parts (above a comparator level) based on the reflected light from portions in the nearly amorphous state, than parts (below the comparator level) based on the reflected light from portions in the crystalline state. Therefore, the comparator level was set at a position which was closer to a reflection factor level corresponding to the crystalline state, with respect to the middle between the highest reflection factor and the lowest reflection factor (for both of which the reflection factors of singular points were removed). This method of setting the level is also effective for the rewriting based on the single beam.

Figure 13:
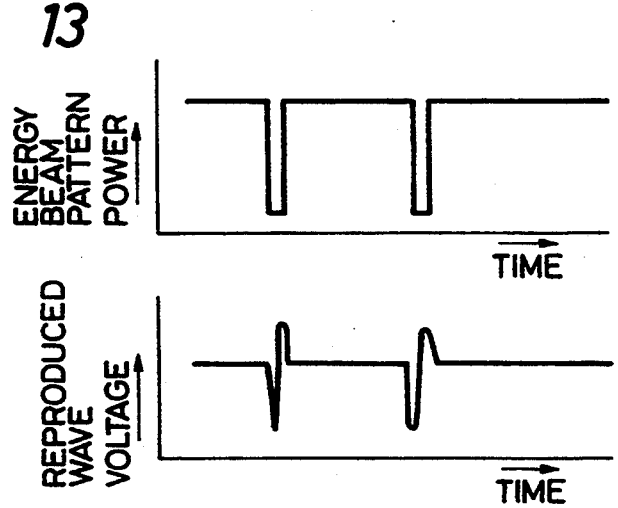
FIG. 13 is a diagram showing differential type reproduced waveforms in an embodiment of the present invention.

Besides, in a case where the method of lowering power from the high power level to the low power level in pulse shape as in the second beam to-be-subsequently-projected in the method depicted in FIG. 1D is applied to a recording film capable of very fast crystallization, the power fall part and rise part of a read signal have their voltage levels changed in opposite directions and in pulsed fashion as illustrated in FIG. 13 on account of the difference of cooling rates, and hence, the changes correspond to the differential waveform of a recording waveform. This method can overwrite recording, and is also effective for the rewrite operation based on the single beam.

Appropriate composition ranges in the case of changing the composition of the recording film in the present embodiment, were as described below. In the recording film of the aforementioned composition $In_{51}Te_{15}Se_{34}$:

(1) when the content Y of Te was changed with the relative ratios of the other elements held constant, the crystallization temperature changed as follows;

| | |
|---|---|
| Y = 0 | 120° C. |
| Y = 2 | 130° C. |
| Y = 3 | 150° C. |
| Y = 25 | 150° C. |
| Y = 35 | 130° C. |

(2) next, when the content Z of In was changed with the relative ratios of the other elements held constant, the crystallization temperature and noise level in the case of raising the temperature at a fixed rate changed as follows;

| | Crystallization Temperature |
|---|---|
| Z = 0 | Crystallized since the time of film formation |
| Z = 25 | 100° C. |
| Z = 35 | 150° C. |
| Z = 40 | 180° C. |
| Z = 60 | 180° C. |
| Z = 70 | 150° C. |
| Z = 80 | Crystallized since the time of film formation |
| | Noise Level (Relative Value) |
| Z = 0 | 0 dB |
| Z = 20 | 0 dB |
| Z = 25 | 0 dB |
| Z = 50 | +1 dB |
| Z = 60 | +30 dB |
| Z = 70 | +40 dB |
| Z = 80 | +40 dB |

(3) further, when the content $\alpha$ of Se was changed with the relative ratios of the other elements held constant, the crystallization temperature in the case of raising the temperature at a fixed rate changed as follows;

| | Crystallization Temperature |
|---|---|
| $\alpha = 15$ | Crystallized since the time of film formation |
| $\alpha = 20$ | 150° C. |
| $\alpha = 40$ | 200° C. |
| $\alpha = 70$ | 200° C. |
| $\alpha = 80$ | 150° C. |
| $\alpha = 90$ | Crystallized since the time of film formation |

(4) lastly, when the recording film of the present embodiment is doped with transition metal elements among the other elements than In, Te and Se mentioned above, there are such effects as enhancement in the erasing (crystallizing) rate and rise in the crystallization temperature, namely, enhancement in the lifetime of keeping a recorded state. By way of example, in case of adding Co, when the amount of addition X was changed with the relative ratios of the other elements held constant, the following effects were produced;

| | Erasing Time | Crystallization Temperature |
|---|---|---|
| X = 1 | 0.3 μs | 250° C. |
| X = 3 | 0.2 μs | 300° C. |
| X = 5 | 0.1 μs | 350° C. |
| X = 15 | 0.2 μs | 350° C. |
| X = 20 | 0.3 μs | 350° C. |

As the amount of addition of Co, accordingly, a value of at least 1% and at most 20% is preferable, and a value of at least 3% and at most 15% is especially preferable.

Apart from Co, even with the transition metal element such as Ni (at least one element among group-a elements from group IIIa to group VIIa, and group-VIII and group-Ib elements), substantially the same effects are attained. Among such elements, Co is especially preferable. Further, when among the other elements than In, Te and Se, at least one element of Tl, halogen elements, alkali metal elements and alkaline-earth metal elements is added in an amount of at least 1% and at most 20%, more preferably at least 3% and at most 15%, there is the effect of shortening the erasing time. Among these elements, Tl is especially preferable.

When Se mentioned above is partly or wholly replaced with S, there are effects such as decrease in toxicity. However, the recording sensitivity degrades.

Te mentioned above may well be partly or wholly replaced with at least one element among Zn, Cd, Al, Ga, Si, Ge, Sn, Pb, As, Sb and Bi. However, there is such a problem that the replacing element affords a less rise in the crystallization temperature as compared with Te.

When the ZnS layer of the present embodiment to be formed on the recording film later was substituted by a layer made of at least one substance among PbTe, SnTe, low oxides of Ti and low oxides of Cr, light transmitted through the recording film was absorbed by the substitute layer and generated heat, so that the recording sensitivity was enhanced. Apart from the above materials, any material the melting point or softening point of which is higher than the highest melting point of crystals to be formed within the recording film is usable for the substitute layer. It is more favorable that as a protective layer on this layer or as an intermediate layer between the recording film and this layer, a layer is further formed of any of sulfides, nitrides, fluorides, oxides, etc. which have high melting points and small light absorption coefficients. The thickness of the intermediate layer should preferably be at least 3 nm and at most 50 nm. In addition, it is common that, since the quantity of light which is absorbed within the recording film is larger on a light entry side and smaller on a reflection side, a temperature distribution arises in the direction of the thickness of the film. In this regard, unerased parts, etc., ascribable to the appearance of such a temperature distribution can be prevented by the heat generation of the aforementioned layer of PbTe or the like. The light absorption coefficient of this layer should preferably be greater than that of the recording film, and the thermal conductivity thereof should preferably be at most 5 times that of the recording film.

Even when the recording film of the present embodiment was replaced with a recording film of an Sb-Te-Se system, substantially the same recording could be performed by regulating the rotational frequency of the disk. In this case, the preferable range of the Sb content was a range of at least 30% and at most 70% in terms of atomic percentage, the preferable range of the Te content was a range of at least 3% and at most 30%, and the preferable range of the Se content was a range of at least 20% and at most 80%. Changes in the case of substituting S for the part or the whole of Se are similar to those of the preceding example. It is also possible to partly or wholly replace Sb with at least one element among As, Bi, Si, Ge, Sn, Pb, Ga, In, Zn and Cd. Besides, it is the same as in the preceding example that the other elements such as Co denoted by A may well be added.

Even when the recording film of the present embodiment was replaced with a recording film of a In-Se-Tl system, substantially the same recording could be performed by regulating the rotational frequency of the disk. In this case, the preferable range of the In content was a range of at least 45% and at most 65% in terms of atomic percentage, the preferable range of the Se content was a range of at least 30% and at most 50%, and the preferable range of the Tl content was a range of at least 3% and at most 15%. High-speed erasure is similarly possible even when the part or the whole of Tl is replaced with at least one element among transition metal elements such as Co, alkali metal elements, alkaline-earth metal elements and halogen elements. Among them, elements each having only one linkage hand with another element within the film is especially preferable. Changes in the case of substituting S for part or whole of the Se are similar to those of the preceding example. In may well be partly or wholly replaced with at least one element among Zn, Cd, Ga, Sn, Si, Ge, As, Sb and Pb. Among them, In is the most preferable, followed by Sb. Alternatively, another element less than 30% may well be contained.

Even when the recording film of the present embodiment was replaced with a recording film of an Sb-Te-Tl system, substantially the same recording could be performed by regulating the rotational frequency of the disk. The preferable content range of Sb was at least 20% and at most 65% in terms of atomic percentage, the preferable range of Te was at least 30% and at most 75%, and the preferable range of Tl was at least 1% and at most 30%. Sb may well be partly or wholly replaced with at least one element among Zn, Cd, Ga, In, Sn, Si, Ge, As, Bi and Pb. It is the same as in the preceding example that part or the whole of Tl may well be replaced with at least one element among halogen elements, group-a elements from group Ia to group VIIa, group-VIII elements and group-Ib elements. Besides, another element less than 30% may well be contained.

Embodiment 2

The present embodiment verifies if the rewriting of recording is properly performed.

A medium used was substantially the same as that of Embodiment 1 shown in FIG. 6, but it differed in that the composition of a recording film 4 was $In_{51}Se_{44}Te_5$ and that the thickness of a ZnS layer 3 being an antireflection layer and also a protective layer was about 100 nm.

Information was recorded on the medium in the same way as in Embodiment 1.

Figure 8:
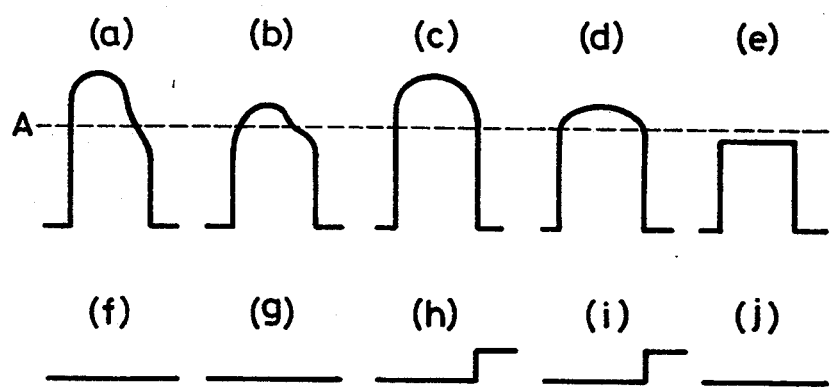
FIGS. 8 shows are diagrams (a)-(g) showing parts of the reflected light signals of a high-power laser beam in an embodiment of the present invention, and diagrams (f)-(j) showing the error signals of the signals illustrated in diagrams (a)-(e) respectively.
Figure 9:
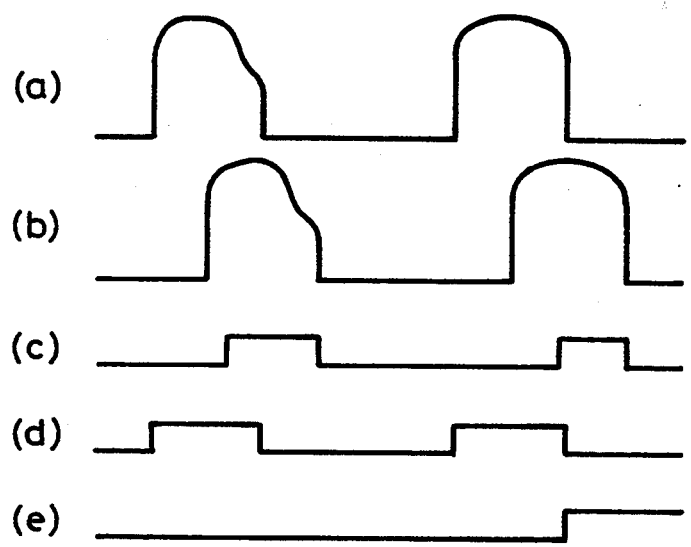
FIGS. 9 shows are time charts (a)-(e) showing a method of obtaining stable error signals in an embodiment of the present invention.
Figure 10:
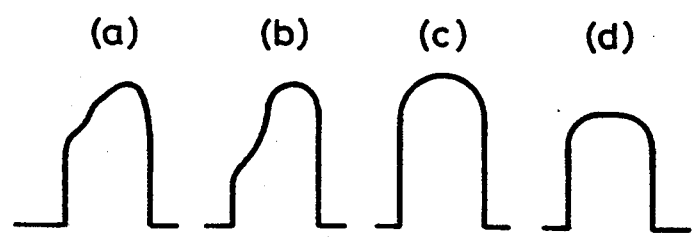
FIGS. 10 shows are diagrams (a)-(d) showing parts of the reflected light signals of a high-power laser beam in an embodiment of the present invention.

Subsequently, whether the rewriting of recording had been reliably performed was verified as stated below. In order to know if state changes were reliably effected when the laser beams the powers of which were modulated according to the respective patterns of FIG. 1A–FIG. 5E were projected, whether reflection factors changed in correspondence with the projections of a high-power laser beam and an intermediate-power laser beam was verified. A part irradiated with the high-power laser beam becomes a state determined by the crystallization rate of the recording film, irrespective of whether the state thereof before the irradiation is a state of poor crystallinity or a state of good crystallinity and a part irradiated with the intermediate-power laser beam becomes a state of good crystallinity (with some materials of the recording film, however, the states reverse). Therefore, when the intensity signals of reflected laser beams are derived in such a manner that signals to be recorded anew are divided every unit by utilizing clock signals read out of the disk, they become as shown in FIG. 8 and FIG. 10, respectively. In a case where, upon the projection of the high-power laser beam, the recording film is once melted, the intensity signal becomes a waveform depicted in (a) or (b) of FIG. 8; in a case where a melted state continues, the intensity signal becomes a waveform depicted in (e) of FIG. 8; and in a case where no change occurs (in case of an error), the intensity signal becomes a waveform depicted in (c) or (d) of FIG. 8. In FIG. 8, (a) or (c) corresponds to the state in which the reflection factor before the projection is high, whereas (b) or (d) corresponds to the state in which the reflection factor is low. Next, a comparator level is set as indicated by A in FIG. 8, so as to generate an error signal in a case where the input signal is above the comparator level at a position at which the input signal of one unit ends. Then, only on the occasions (c) and (d) in FIG. 8, the error signals are generated as depicted in (h) and (i). With this method, an error rate is high for a reflection factor fluctuation attributed to nonuniformity in the formation of the recording film or to the rewriting. Therefore, a method to be stated below is more favorable as another method of generating the error signals on the occasions (c) and (d) in FIG. 8. With respect to reflected-light intensity signals ((a) in FIG. 9), signals each of which is delayed ½ of the pulse width of the reflected-light intensity signal are formed as shown in (b) of FIG. 9. Subsequently, the two signals are passed through a comparator. Then, in a case where the delayed signal is greater than the original signal, the output of the comparator becomes a high level, so that output signals shown in (c) of FIG. 9 are obtained. Only when the comparator output signal rises within 20 ns after the fall of a recording signal pulse as in the right-hand waveform in (c) of FIG. 9, is the error signal is generated. Then, the error signal appears as illustrated in (e) of FIG. 9. This signifies that the error signals appear in the cases (c) and (d) in FIG. 8. With this method, however, the error signal is also generated on the occasion shown in (e) of FIG. 8. It is therefore necessary to adopt, e.g., a method in which the comparison with the fixed comparator level indicated by A in FIG. 8 is also made so as to cancel the error signal in the case (e) in FIG. 8 where the comparator level is not exceeded at all.

Figure 11:
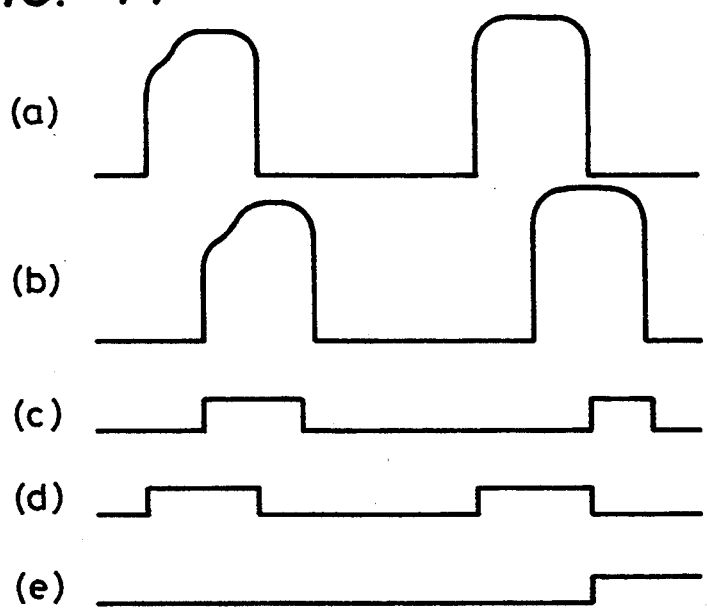
FIGS. 11 shows are time charts (a)-(e) showing a method of obtaining stable error signals in an embodiment of the present invention.

Meanwhile, in a case where the output of a high-power laser beam is as particularly great as 15 mW or more, the signals of a reflected beam dividedly taken out by utilizing the clock become as shown in FIG. 10. In a case where the recording film melts, the signal has a waveform depicted in (a) or (b) of FIG. 10, and in a case where the film does not change at all (in case of an error), the signal has a waveform depicted in (c) or (d) of FIG. 10. As a method of generating error signals on only the occasions (c) and (d), the following method is employed: With respect to reflected-light intensity signals shown in (a) of FIG. 11, signals each of which is delayed ½ of the pulse width of the intensity signal (the unit length of information) are formed ((b) in FIG. 11). Subsequently, the two signals are passed through a comparator. Thus, in a case where the original signal is greater than the delayed signal, the output of the comparator is rendered a high level, and the comparator output is delayed ½ of the pulse width. Then, signals shown in (c) of FIG. 11 are obtained. Only when the comparator output rises within a fixed time (here, within 20 ns) since the fall of the pulse of a recording signal, as in the right-hand wave form in (c) of FIG. 9, is the error signal is generated. Then, the error signal appears as illustrated in (e) of FIG. 11. This signifies that the error signals appear in only the cases (c) and (d) of FIG. 10.

Figure 12:
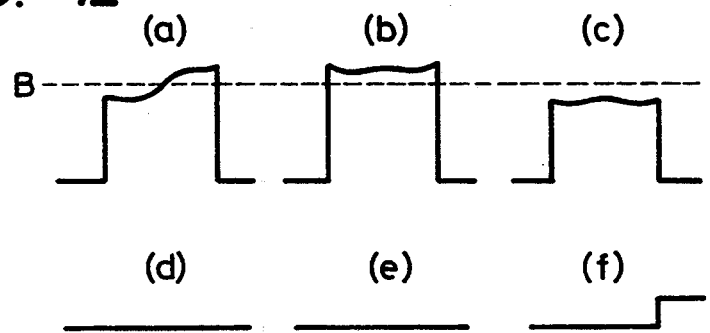
FIGS. 12 shows are diagrams (a)-(c) showing parts of the reflected light signals of a low-power laser beam in an embodiment of the present invention, and diagrams (d)-(f) showing the error signals of the signals illustrated in diagrams (a)-(c) respectively.

On the other hand, in a case where crystallization (the change of the quality of crystallinity in either direction) occurs in a part irradiated with a laser beam at the intermediate power level, a waveform depicted in (a) or (b) of FIG. 12 is obtained, and in a case where no change occurs, a waveform depicted in (c) of FIG. 12 is obtained. Here, (b) in FIG. 12 shows the reflected light waveform of a part in which the crystallization is continuing from a preceding section or which has already attained a state of good crystallinity. Next, a comparator is set at a level indicated by B in FIG. 12, so as to generate an error signal in a case where the reflected-light signal is lower than the comparator level at a position at which the unit length of information ends. Then, the error signal appears on only the occasion (c). In a case where the reflection factor is lowered by the change of the crystallinity, the error signal is generated in a case where the reflected-light signal is higher than the comparator level at the aforementioned position.

In a case where both the verification during the projection of the high-power laser beam and the verification during the projection of the intermediate-power laser beam were simultaneously performed and where error parts were rewritten, the error rate was $1 \times 10^{-6}$. On the other hand, in cases of performing only one of the verifications, when the verification was executed only for the projection of the high-power laser beam and error parts were rewritten, the error rate was $7 \times 10^{-5}$, whereas when the verification was executed only for the projection of the low-power laser beam and error parts were-rewritten, the error rate was $5 \times 10^{-5}$. These results are based on the fact that the changes by the projection of the high-power laser beam are effected at a higher reliability. By the way, in a case where in each of the modulation patterns of FIG. 1A–FIG. 5E, the beam to be subsequently projected (second beam) has a section which is irradiated with the low power, whether or not the reflection light intensity of the section is as expected in accordance with a recording signal is verified, and in case of an error, recording is rewritten, whereby the error rate is more improved.

The above embodiment has been described as to the method in which the recording or erasure is verified by utilizing the reflected light of the projected laser beam. However, even when transmitted light is utilized, the recording or erasure can be verified by a similar method though an apparatus therefor becomes complicated. In addition, the method explained here is usable also in case of performing the verify operation as well as the rewrite operation by means of a single laser beam.

Information from the disk subjected to recording as stated above was read out as follows: Both the power levels of the two laser beams to enter the disk were set at 1 mW of the read power level. While tracking and autofocusing were being performed, a reproduced signal was obtained on the basis of the output voltage of a photodetector which corresponded to the intensity of the reflected light of the beam to be first projected on the disk. A reproduced signal may well be obtained from the reflected light of the beam to be subsequently projected on the disk. Besides, in the read mode, only one beam may well be used in such a manner that the power of the beam not used is rendered 0 (zero). The reproduced signal was waveform-transformed by a comparator. In this regard, as shown in FIG. 13, the level of the reproduced signal fluctuates more in parts based on the reflected light from portions in a state irradiated with the high-power laser beam (including portions falling from the high power level), than parts based on the reflected light from portions in a state irradiated with the intermediate-power laser beam. Therefore, the comparator level was set at a position which was closer to a reflection factor level corresponding to the state irradiated with the intermediate-power laser beam, with respect to the middle between the highest reflection factor and the lowest reflection factor (for both of which the reflection factors of singular points not corresponding to signals, such as defects, were excluded). This level-setting method is also effective for the rewrite (overwrite) operation based on the single beam.

As an example of application of the above method, it is also possible to add one or more further beams before or/and after the two beams of the present invention. The additional beams can also be used for assisting the recording and erasure or for the verification. These beams may be circular or elliptical, or may well be in another shape.

We claim:

1. A method of recording information on a recording medium, comprising the steps of:

generating first and second energy beams;

projecting the first and second energy beams onto a recording medium such that regions of the recording medium on which the first and second energy beams are incident have substantially the same shape and area, and such that the first energy beam is incident on a portion of the recording medium on which information is to be recorded before the second energy beam is incident on the portion of the recording medium;

controlling the first energy beam to cause the portion of the recording medium uniformly to exhibit one of two phase or magnetization direction states; and controlling including modulating the second energy beam between non-zero power levels to change the phase or magnetization direction state of a part of the portion of the recording medium, or to cause the portion of the recording medium to exhibit at least the two phase or magnetization direction states including a first phase or magnetization direction state and a second phase or magnetization direction state, thereby recording information on the portion of the recording medium by controlling the first and second energy beams during one relative rotational pass of the first and second energy beams on the recording medium.

2. A method according to claim 1, wherein the step of controlling the first energy beam includes increasing a power of the first energy beam from a low power level to a high power level and maintaining the power of the first energy beam substantially constant at the high power level, and the step of controlling the second energy beam includes modulating a power of the second energy beam between an intermediate power level and the high power level according to information signals representing information to be recorded on the portion of the recording medium, thereby recording information on the portion of the recording medium over any information which was previously recorded on the portion of the recording medium.

3. A method according to claim 1, wherein the step of controlling the first energy beam includes maintaining a power of the first energy beam substantially constant at a high power level, and the step of controlling the second energy beam includes setting a power of the second energy beam according to information signals representing information to be recorded on the portion of the recording medium at an intermediate power level for parts of the portion of the recording medium which are to be irradiated at the intermediate power level, and at a low power level for other parts of the portion of the recording medium, thereby recording information on the portion of the recording medium over any information which was previously recorded on the portion of the recording medium.

4. A method according to claim 1, wherein the step of controlling the first energy beam includes maintaining a power of the first energy beam substantially constant at a high power level, and the step of controlling the second energy beam includes modulating a power of the second energy beam between a low power level and the high power level according to information signals representing information to be recorded on the portion of the recording medium, thereby recording information on the portion of the recording medium over any information which was previously recorded on the portion of the recording medium.

5. A method according to claim 1, wherein the step of controlling the first energy beam includes maintaining a power of the first energy beam substantially constant at a high power level, and the step of controlling the second energy beam includes modulating a power of the second energy beam between the high power level and a power level between a zero power level and the high power level according to information signals representing information to be recorded on the portion of the recording medium, thereby recording information on the portion of the recording medium over any information which was previously recorded on the portion of the recording medium.

6. A method according to claim 1, wherein the step of controlling the first energy beam includes maintaining a power of the first energy beam substantially constant at an intermediate power level greater than a low power level, and the step of controlling the second energy beam includes modulating a power of the second energy beam between the intermediate power level and a high power level according to information signals representing information to be recorded on the portion of the recording medium, thereby recording information on the portion of the recording medium over any information which was previously recorded on the portion of the recording medium.

7. A method according to claim 1, wherein the step of controlling the first energy beam includes maintaining a power of the first energy beam substantially constant at an intermediate power level, and the step of controlling the second energy beam includes modulating a power of the second energy beam between a low power level and a high power level according to information signals representing information to be recorded on the portion of the recording medium, thereby recording information on the portion of the recording medium over any information which was previously recorded on the portion of the recording medium.

8. A method according to claim 1, wherein the step of controlling the first energy beam includes maintaining a power of the first energy beam substantially constant at an intermediate power level greater than a low power level, and the step of controlling the second energy beam includes modulating a power of the second energy beam between a high power level and a power level between the high power level and a zero power level according to information signals representing information to be recorded on the portion of the recording medium, thereby recording information on the portion of the recording medium over any information which was previously recorded on the portion of the recording medium.

9. A method according to claim 1, wherein the step of projecting the first and second energy beams includes projecting the first and second energy beam within a period of time corresponding to one revolution of the recording medium to enable erasing and recording of information on the portion of the recording medium within the period of time corresponding to one revolution of the recording medium.

10. A method of recording information on a recording medium, comprising the steps of:
generating first and second energy beams;
projecting the first and second energy beams onto the recording medium such that regions of the recording medium on which the first and second energy beams are incident have substantially the same shape and area, and such that the first energy beam is incident on a portion of the recording medium on which information is to be recorded before the second energy beam is incident on the portion of the recording medium;
controlling the first energy beam to record information on the portion of the recording medium over any information which was previously recorded on the portion of the recording medium; and
controlling the second energy beam between non-zero power levels to again record the information on the portion of the recording medium over any information which was previously recorded on the portion of the recording medium, or to perform re-projection to ensure that a phase or magnetization direction state of parts of the portion of the recording medium is changed from one phase or magnetization direction state to another phase or magnetization direction state;
wherein the steps of controlling the first and second energy beams are effected during one relative rotational pass of first and second energy beams on the recording medium.

11. A method according to claim 10, wherein one step of the step of controlling the first energy beam and the step of controlling the second energy beam includes modulating a power of a corresponding energy beam of the first and second energy beams between an intermediate power level greater than a low power level and a high power level according to information signals representing information to be recorded on the portion of the recording medium.

12. A method according to claim 10, wherein the step of controlling the first energy beam includes modulating a power of the first energy beam between an intermediate power level and a high power level according to information signals representing information to be recorded on the portion of the recording medium, and the step of controlling the second energy beam includes modulating a power of the second energy beam between the intermediate power level and a low power level according to the information signals, thereby recording information on the portion of the recording medium over any information which was previously recorded on the portion of the recording medium.

13. A method according to claim 10, wherein the step of controlling the first energy beam includes modulating a power of the first energy beam between an intermediate power level and a high power level according to information signals representing information to be recorded on the portion of the recording medium, and the step of controlling the second energy beam includes modulating a power of the second energy beam between a low power level and the high power level according to the information signals, thereby recording information on the portion of the recording medium over any information which was previously recorded on the portion of the recording medium.

14. A method according to claim 10, wherein the step of projecting the first and second energy beams includes projecting the first and second energy beam within a period of time corresponding to one revolution of the recording medium to enable erasing of information and recording of information on the portion of the recording medium.

15. A method of recording information on a recording medium, comprising the steps of:
generating two energy beams;
projecting the two energy beams onto a recording medium such that regions of the recording medium on which the two energy beams are incident have substantially the same shape and area, and such that one energy beam of the two energy beams is incident on a portion of the recording medium on which information is to be recorded before another energy beam of the two energy beams is incident on the portion of the recording medium;
controlling a first energy beam of the two energy beams to change a phase or magnetization direction state of a part of the portion of the recording medium in a predetermined direction; and
controlling a second energy beam of the two energy beams to change a phase or magnetization direction state of a part of the portion of the recording medium in a direction opposite to the predetermined direction and to modulate a power of the second energy beam between an intermediate power level and the high power level according to information signals representing information to be recorded on the portion of the recording medium, thereby recording information on the portion of the recording medium over any information which was previously recorded on the portion of the recording medium.

16. A method according to claim 15, wherein the step of controlling the first energy beam includes setting a power of the first energy beam according to information signals representing information to be recorded on the portion of the recording medium at an intermediate power level for parts of the portion of the recording medium which are to be irradiated at the intermediate power level, and at a low power level for other parts of the portion of the recording medium, and the step of controlling the second energy beam includes modulating a power of the second energy beam between the low power level and a high power level according to the information signals, thereby recording information on the portion of the recording medium over any information which was previously recorded on the portion of the recording medium.

17. A method according to claim 15, wherein the step of controlling the first energy beam includes setting a power of the first energy beam according to information signals representing information to be recorded on the portion of the recording medium at an intermediate power level for parts of the portion of the recording medium which are to be irradiated at the intermediate power level, and at a low power level for other parts of the portion of the recording medium, and the step of controlling the second energy beam includes modulating a power of the second energy beam between the intermediate power level and a high power level according to the information signals, thereby recording information on the portion of the recording medium over any information which was previously recorded on the portion of the recording medium.

18. A method according to claim 15, wherein the step of controlling the first energy beam includes modulating a power of the first energy beam between a low power level and a high power level according to information signals representing information to be recorded on the portion of the recording medium, and the step of controlling the second energy beam includes modulating a power of the second energy beam between an intermediate power level and a high power level according to the information signals, thereby recording information on the portion of the recording medium over any information which was previously recorded on the portion of the recording medium.

19. A method according to claim 15, wherein the step of controlling the first energy beam includes setting a power of the first energy beam according to information signals representing information to be recorded on the portion of the recording medium at a high power level for parts of the portion of the recording medium which are to be irradiated at the high power level, and at a low power level for other parts of the portion of the recording medium, and the step of controlling the second energy beam includes setting a power of the second energy beam according to the information signals at an intermediate power level for parts of the portion of the recording medium which are to be irradiated at the intermediate power level, and at the low power level in other parts of the portion of the recording medium.

20. A method according to claim 15, wherein the step of projecting the first and second energy beams includes projecting the first and second energy beam within a period of time corresponding to one revolution of the recording medium to enable erasing and recording of information on the portion of the recording medium within the period of time corresponding to one revolution of the recording medium.

21. A method of recording information on and reproducing information from a recording medium, comprising the steps of:
generating two energy beams;
projecting the two energy beams onto a recording medium such that regions of the recording medium on which the two energy beams are incident have substantially the same shape and area, and such that one energy beam of the two energy beams is incident on a portion of the recording medium on which information is to be recorded before another energy beam of the two energy beams is incident on the portion of the recording medium;
modulating a first energy beam of the two energy beams between non-zero power levels to record information on the portion of the recording medium over any information which was previously recorded on the portion of the recording medium; and
maintaining a power of a second energy beam of the two energy beams at a constant low power level to read information recorded on the portion of the recording medium, the steps of modulating and maintaining being effected during one relative rotational pass of the first and second energy beam on the recording medium.

22. A method according to claim 21, wherein the step of projecting the first and second energy beams includes projecting the first and second energy beam within a period of time corresponding to one revolution of the recording medium to enable erasing and recording of information on the portion of the recording medium within the period of time corresponding to one revolution of the recording medium.

23. A method of recording information on a recording medium, comprising the steps of:
generating first and second energy beams;
projecting the first and second energy beams onto a recording medium such that regions of the recording medium on which the first and second energy beams are incident have substantially the same shape and area, and such that the first energy beam is incident on a portion of the recording medium on which information is to be recorded before the second energy beam is incident on the portion of the recording medium;
modulating a power of the first energy beam at a fixed frequency between non-zero power levels to record information on the portion on the recording medium over any information which was previously recorded on the portion of the recording medium, or to change a phase or magnetization direction state of a part of the portion of the recording medium in a predetermined direction; and
controlling the second energy beam to record information on the portion of the recording medium over any information which was previously recorded on the portion of the recording medium, or to change a phase or magnetization direction state of a part of the portion of the recording medium in a direction opposite to the predetermined direction;
wherein the steps of modulating and controlling are effected during one relative rotational pass of the first and second energy beams on the recording medium.

24. A method according to claim 23, wherein the step of projecting the first and second energy beams includes projecting the first and second energy beam within a period of time corresponding to one revolution of the recording medium to enable erasing and recording of information on the portion of the recording medium within the period of time corresponding to one revolution of the recording medium.

25. A method of recording information on a recording medium, comprising the steps of:
generating first and second energy beams;
projecting the first and second energy beams onto a recording medium such that regions of the recording medium on which the first and second energy beams are incident have substantially the same shape and area, and such that the first energy beam is incident on a portion of the recording medium on which information is to be recorded before the second energy beam is incident on the portion of the recording medium;
controlling the first and second energy beams between non-zero power levels to record information for a first time on the portion of the recording medium, or to record information on the portion of the recording medium over any information which was previously recorded on the portion of the recording medium, by increasing a power of the first energy beam and a power of the second energy beam above a read power level; and controlling the second energy beam to verify whether the information has been properly recorded on the portion of the recording medium;

wherein the steps of controlling are effected during one relative rotational pass of the first and second energy beams on the recording medium.

26. A method according to claim 25, wherein the step of projecting the first and second energy beams includes projecting the first and second energy beam within a period of time corresponding to one revolution of the recording medium to enable erasing and recording of information on the portion of the recording medium within the period of time corresponding to one revolution of the recording medium.

27. A method of recording information on a recording medium, comprising the steps of:

generating first and second energy beams;

projecting the first and second energy beams onto the recording medium such that regions of the recording medium on which the first and second energy beams are incident have substantially the same shape and area, and such that the first energy beam is incident on a portion of the recording medium on which information is to be recorded before the second energy beam is incident on the portion of the recording medium;

controlling the first energy beam including modulating a power of the first energy beam between a high power level and a power level between the high power level and a zero power level according to information signals representing information to be recorded on the portion of the recording medium; and controlling the second energy beam including modulating a power of the second energy beam between an intermediate power level and the high power level according to information signals representing information to be recorded on the portion of the recording medium, thereby recording information on the portion of the recording medium over any information which was previously recorded on the portion of the recording medium;

wherein the steps of controlling are effected during one relative rotational pass of the first and second energy beams on the recording medium.

28. A method of recording information on a recording medium, comprising the steps of:

generating first and second energy beams;

projecting the first and second energy beams onto the recording medium such that regions of the recording medium on which the first and second energy beams are incident have substantially the same shape and area, and such that the first energy beam is incident on a portion of the recording medium on which information is to be recorded before the second energy beam is incident on the portion of the recording medium;

controlling the first energy beam including modulating a power of the first energy beam between a high power level and a power level between the high power level and a zero power level according to information signals representing information to be recorded on the portion of the recording medium; and controlling the second energy beam including modulating a power of the second energy beam between non-zero power levels including a low power level and an intermediate power level according to the information signals;

wherein the steps of controlling are effected during one relative rotational pass of the first and second energy beams on the recording medium.

29. A method of recording information on a recording medium, comprising the steps of:

generating first and second energy beams;

projecting the first and second energy beams onto the recording medium such that regions of the recording medium on which the first and second energy beams are incident have substantially the same shape and area, and such that the first energy beam is incident on a portion of the recording medium on which information is to be recorded before the second energy beam is incident on the portion of the recording medium;

controlling a first energy beam of the two energy beams to read at a read power level information recorded on the portion of the recording medium; and controlling the second energy beam including modulating a power of the second energy beam between non-zero power levels including an intermediate power level and the high power level according to information signals representing information to be recorded on the portion of the recording medium, thereby recording information one the portion of the recording medium over any information which was previously recorded on the portion of the recording medium;

wherein the steps of controlling are effected during one relative rotational pass of the first and second energy beams on the recording medium.

* * * * *